US009880021B2

(12) United States Patent
Brenner et al.

(10) Patent No.: US 9,880,021 B2
(45) Date of Patent: Jan. 30, 2018

(54) SYSTEMS AND METHODS FOR ATTITUDE FAULT DETECTION IN ONE OR MORE INERTIAL MEASUREMENT UNITS

(71) Applicant: Honeywell International Inc., Morristown, NJ (US)

(72) Inventors: Mats Anders Brenner, Plymouth, MN (US); John R. Morrison, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 549 days.

(21) Appl. No.: 14/563,597

(22) Filed: Dec. 8, 2014

(65) Prior Publication Data

US 2016/0290825 A1    Oct. 6, 2016

Related U.S. Application Data

(60) Provisional application No. 62/066,127, filed on Oct. 20, 2014.

(51) Int. Cl.
*G01S 19/54* (2010.01)
*G01C 9/34* (2006.01)
(Continued)

(52) U.S. Cl.
CPC ......... *G01C 23/005* (2013.01); *G01C 21/165* (2013.01); *G01S 19/47* (2013.01); *G01S 19/54* (2013.01)

(58) Field of Classification Search
CPC .......... G01S 19/54; G01S 19/44; G01S 19/35; G01S 19/53; G01C 21/165; G01C 9/34;
(Continued)

(56) References Cited

U.S. PATENT DOCUMENTS 2,876,967 A * 3/1959 Glenny ................ G05D 1/0066
244/194
4,786,905 A * 11/1988 Muller ................. G05D 1/0615
33/328
(Continued)

FOREIGN PATENT DOCUMENTS

CN    102692225    9/2012

OTHER PUBLICATIONS

Daneshmand et al., "Precise GNSS Sttitude Determination Based on Antenna Array Processing", "ION GNSS+ 2014, Session E4", Sep. 8-12, 2014, pp. 1-8.
(Continued)

*Primary Examiner* — Yuri Kan
(74) *Attorney, Agent, or Firm* — Fogg & Powers LLC

(57) ABSTRACT

Systems and methods for attitude fault detection in an inertial measurement unit (IMU) are disclosed. In one embodiment, an avionics system comprises: an IMU configured to produce a calculated pitch solution, a calculated roll solution, or both; a monitor coupled to the IMU and configured to produce an estimated pitch solution, an estimated roll solution, or both; a comparator, wherein the comparator determines the difference between the calculated pitch solution and the estimated pitch solution, the difference between the calculated roll solution and the estimated roll solution, or both; and a display device communicatively coupled to the comparator; wherein the display device receives a warning message from the comparator when the difference between the calculated pitch solution and the estimated pitch solution is greater than a pitch threshold, or when the difference between the calculated roll solution and the estimated roll solution is greater than a roll threshold, or both.

18 Claims, 5 Drawing Sheets

(51) Int. Cl.
*G01C 23/00* (2006.01)
*G01C 21/16* (2006.01)
*G01S 19/47* (2010.01)

(58) Field of Classification Search
CPC ... G05D 1/0833; G05D 1/0615; G05D 1/0066
See application file for complete search history.

(56) References Cited

U.S. PATENT DOCUMENTS

| | | | | |
|---|---|---|---|---|
| 6,266,582 | B1* | 7/2001 | Bruckner | G01C 21/165 |
| | | | | 342/357.31 |
| 6,341,248 | B1* | 1/2002 | Johnson | G05D 1/0833 |
| | | | | 244/1 R |
| 6,523,402 | B1* | 2/2003 | Hall | G01C 9/34 |
| | | | | 73/170.02 |
| 7,397,422 | B2* | 7/2008 | Tekawy | G01S 19/53 |
| | | | | 342/357.36 |
| 8,140,223 | B2* | 3/2012 | Whitehead | A01B 79/005 |
| | | | | 701/41 |
| 8,471,762 | B2* | 6/2013 | Zietz | G01S 19/35 |
| | | | | 342/357.3 |
| 2002/0029110 | A1* | 3/2002 | Fukuda | G01C 21/165 |
| | | | | 701/470 |
| 2014/0002300 | A1* | 1/2014 | Leandro | G01S 19/44 |
| | | | | 342/357.27 |

OTHER PUBLICATIONS

De Hilster, "Error in GNSS Augmented Heading Systems: Influence of Attitude", "Hydro International", Oct. 2014. pp. 17-21.
Pinchin, "GNSS Based Attitude Determination for Small Unmanned Aerial Vehicles", Mar. 2011, pp. 1-220.
Sabatini et al., "Carrier-phase GNSS Attitude Determination and Control System for Unmanned Aerial Vehicle Applications", "ARPN Journal of Systems and Software", Nov. 2012, pp. 297-322, vol. 2, No. 11.
Wu et al., "Low-Cost Antenna Attitude Estimation by Fusing Inertial Sensing and Two-Antenna GPS for Vehicle-Mounted Satcom-on-the-Move", "IEEE Transactions on Vehicular Technology", Mar. 2013, pp. 1084-1096, vol. 62, No. 3, Publisher: IEEE.
European Patent Office, "Extended Search Report from EP Application No. 15189448.2 mailed Mar. 1, 2016", "from Foreign Counterpart of U.S. Appl. No. 14/563,597", Mar. 1, 2016, pp. 1-10, Published in: EP.
European Patent Office, "European Office Action for EP Application No. 15189448.2", "from Foreign Counterpart of U.S. Appl. No. 14/563,597", Dec. 22, 2016, pp. 1-4, Published in: EP.

* cited by examiner

SYSTEMS AND METHODS FOR ATTITUDE FAULT DETECTION IN ONE OR MORE INERTIAL MEASUREMENT UNITS

CROSS-REFERENCE TO RELATED APPLICATIONS

This application claims priority to, and the benefit of, U.S. Provisional Patent Application No. 62/066,127, entitled "SYSTEMS AND METHODS FOR ATTITUDE FAULT DETECTION IN ONE OR MORE INERTIAL MEASUREMENT UNITS" which was filed on Oct. 20, 2014 and which is hereby incorporated by reference in its entirety.

BACKGROUND

Aircraft use inertial measurement units (IMUs) to provide attitude solutions (e.g., pitch, roll and heading) along with inertial solutions (e.g., accelerations and angular body rates, which velocity can be determined therefrom) to various displays and systems of the aircraft. Redundant IMUs are oftentimes installed on board an aircraft as a safety measure in case of equipment failure and to provide confirmation of correct readings. In many conventional implementations, three IMUs are used. If one IMU fails, having only two reliable sources for attitude measurements is not problematic in itself, but a situation can develop where one of the two remaining in-service IMUs degrades during flight and begins to output attitude data that includes some level of bias error. In that case, a flight crew needs to be alerted to the problem and needs to be able to determine which of the IMUs is providing accurate attitude measurements and which is not.

For the reasons stated above and for the reasons stated below which will become apparent to those skilled in the art upon reading and understanding the specification, there is a need in the art for alternate systems and methods for attitude fault detection in an IMU.

SUMMARY

The Embodiments of the Present Disclosure provide systems and methods for attitude fault detection in one or more inertial measurement units.

In one embodiment, an avionics system comprises: at least one inertial measurement unit configured to produce a calculated pitch solution, a calculated roll solution, or both; at least one monitor coupled to the at least one inertial measurement unit and configured to produce an estimated pitch solution, an estimated roll solution, or both, wherein the at least one monitor produces the estimated pitch solution by adding angle of attack data to flight path angle data, and wherein the at least one monitor produces the estimated roll solution by calculating a double-differencing solution using data from transversely mounted dual global navigation satellite system antennas; a comparator, wherein the comparator determines the difference between the calculated pitch solution and the estimated pitch solution, the difference between the calculated roll solution and the estimated roll solution, or both; and at least one display device communicatively coupled to the comparator; wherein the at least one display device receives a warning message from the comparator when the difference between the calculated pitch solution and the estimated pitch solution is greater than a pitch threshold, or when the difference between the calculated roll solution and the estimated roll solution is greater than a roll threshold, or both.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
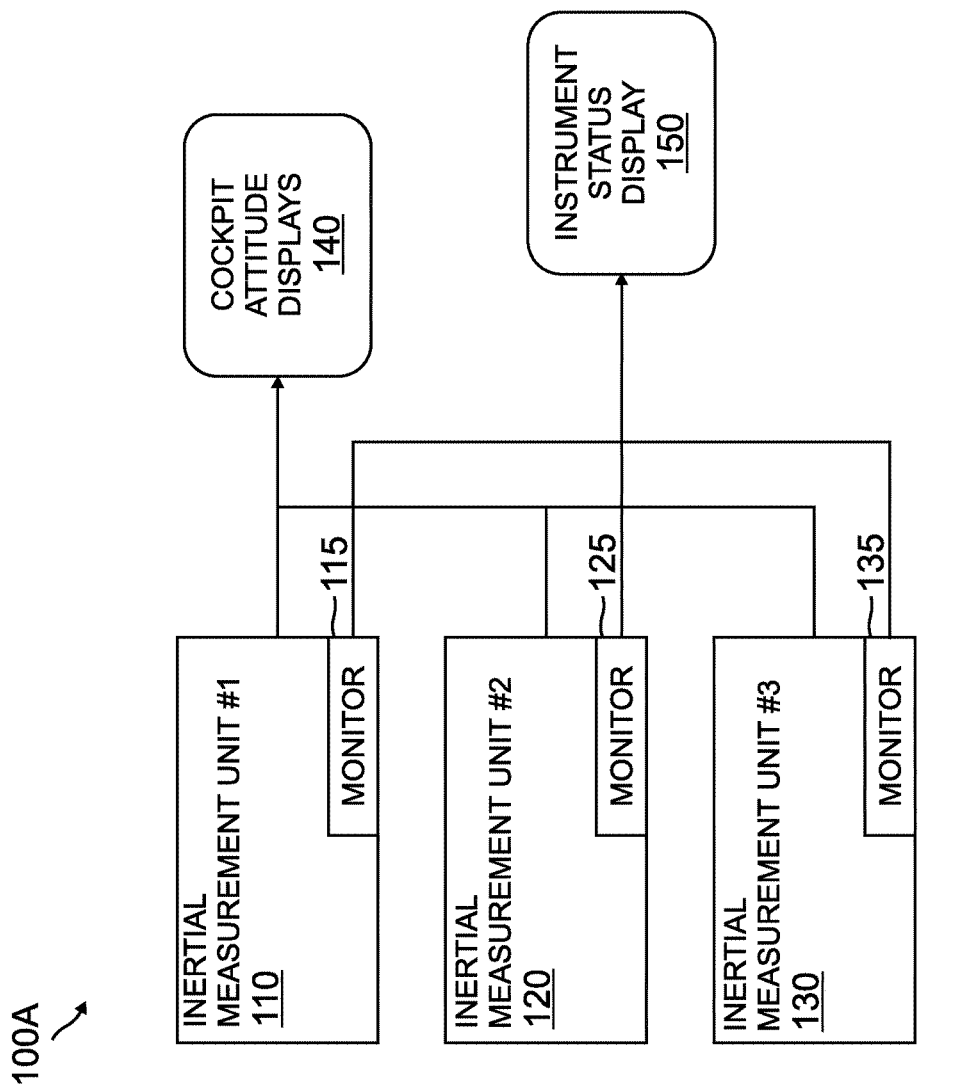
FIGS. 1A-1B are block diagrams illustrating examples of avionics systems that provide attitude fault detection in one or more inertial measurement units to an aircraft's flight crew.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown, by way of illustration, specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed.

The proposed embodiments discussed herein determine when there is a pitch and/or roll error in the attitude output of one or more of two remaining in-service IMUs. Specifically, the roll of an aircraft can be estimated using transversely mounted dual global navigation satellite system (GNSS) antennas. The pitch, on the other hand, can be estimated by adding the flight path angle to the angle of attack. These estimations can be compared against the calculated pitch and roll solutions from one or more IMUs. If the difference between the estimated pitch/roll and the calculated pitch/roll using one or more IMUs is greater than a threshold, then a monitor can send an alert to a display device to alert the flight crew of the faulty IMU.

FIG. 1A is a block diagram illustrating an example of an avionics system 100A that provides attitude fault detection to an aircraft's flight crew. The system 100A includes three IMUs 110, 120, 130. Examples of IMUs can include, but are not limited to, Air Data Inertial Reference Units (ADIRUs) and Attitude Heading Reference Units (AHRU). Further, while three inertial measurements units 110, 120, 130 are shown in FIG. 1A, in alternate embodiments, system 100 may comprise more than, or less than, 3 IMUs. The three IMUs 110, 120, 130 output data to one or more cockpit attitude displays 140 that provide aircraft attitude measurement information to the flight crew.

As stated above, in some instances, one or more of the IMUs 110, 120, 130 can stop working properly. In these instances, conventional navigation systems oftentimes cannot determine if one of the remaining in-service IMUs fails to work properly because there is no longer a third IMU 110, 120, 130 to serve as a tie-breaker. Here, one or more monitors 115, 125, 135 can be used for that purpose, as described in FIG. 2 below. As illustrated in FIG. 1A, in some embodiments, each of the IMUs 110, 120, 130 has an associated sensor monitor 115, 125, 135 that identifies when attitude data from its respective inertial sensor is suspect or has failed and generates an alarm which is displayed on an instrument status display 150. The sensor monitors 115, 125, 135 may be integral to the IMUs 110, 120, 130 as shown in FIG. 1A. In other embodiments, the sensor monitors 115, 125, 135 may be implemented externally from the IMUs 110, 120, 130. For example, in one embodiment, the sensor monitors 115, 125, 135 may be implemented within the avionics equipment associated with the cockpit attitude displays 140, or the instrument status display 150. In other embodiments, a single monitor 105 for the IMUs 110, 120, 130 can be located external to the IMUs 110, 120, 130, as shown in FIG. 1B.

Figure 1B:
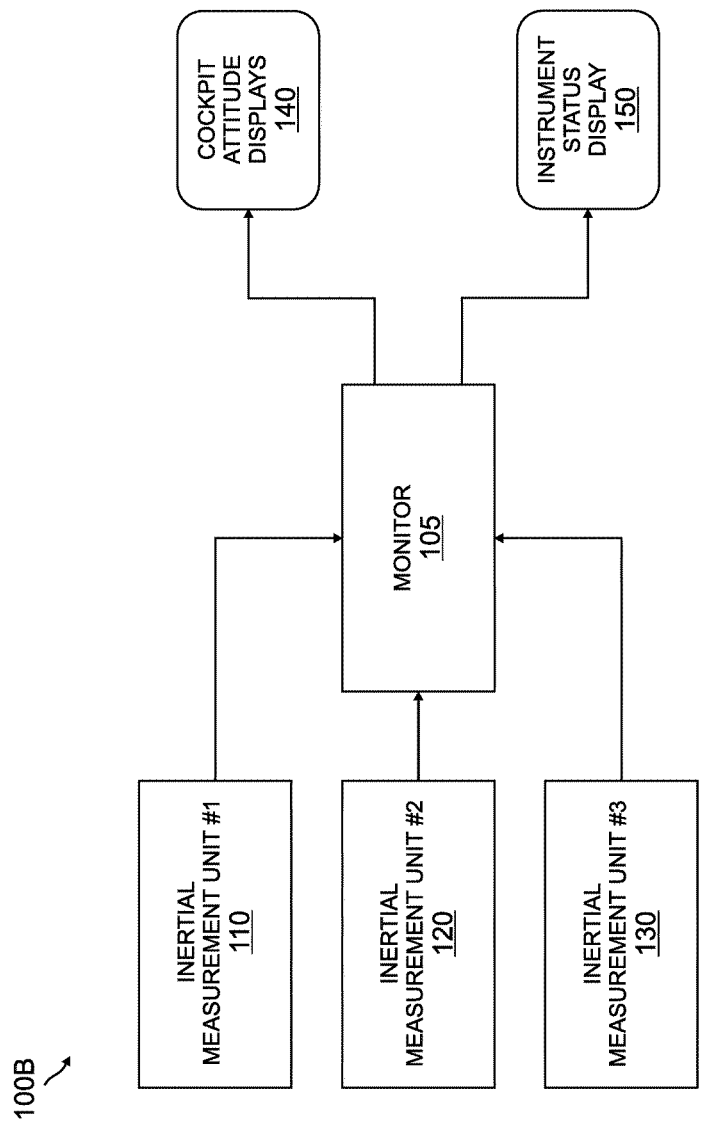
Figure 2A:
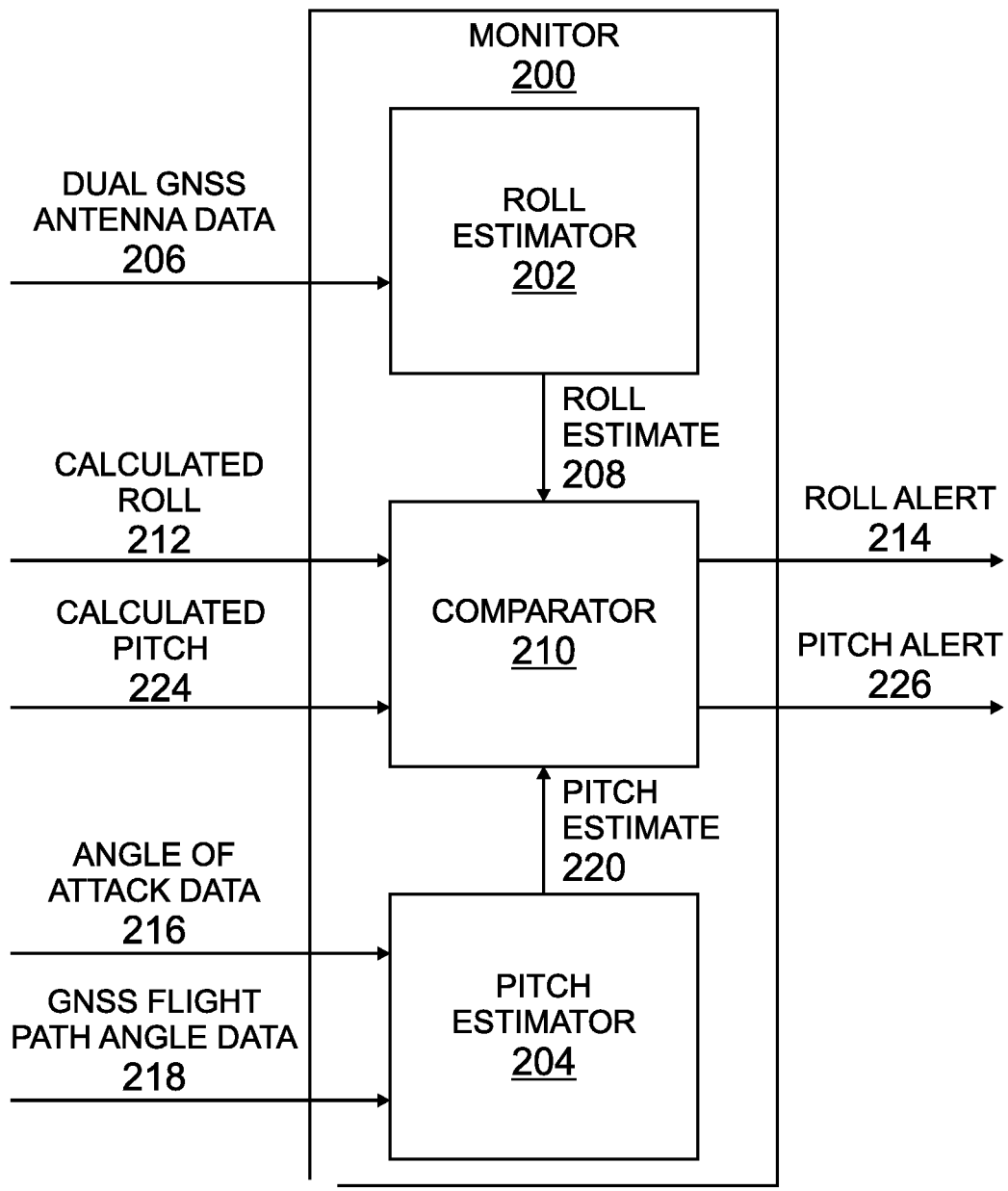
FIGS. 2A-2B are block diagrams illustrating example monitors that can be used in the avionics system described in FIGS. 1A-1B.

FIG. 2A is a block diagram illustrating an example monitor 200 that can be used in the avionics system 100 shown in FIGS. 1A-1B. Generally, the monitor 200 receives data and estimates at least one attitude solution based on the received data. The estimate of the at least one attitude solution will be referred to herein as the at least one estimated attitude. In exemplary embodiments, the monitor 200 includes a roll estimator 202 for estimating roll and a pitch estimator 204 for estimating pitch. However, in some other embodiments, the monitor 200 may only include a roll estimator 202 or only a pitch estimator 204.

In exemplary embodiments, the roll estimator 202 can receive data 206 from transversely mounted dual GNSS antennas. The transversely mounted dual GNSS antennas can be mounted along the fuselage of the aircraft at a known distance apart. Using the data 206 and the known distance between the antennas, the monitor 200 can estimate the roll of the aircraft using double differencing in combination with ambiguity resolution techniques. Specifically, the path length difference for the signals as they travel from a satellite to the dual antennas can be used to determine the attitude, and in this case roll, of an aircraft. That is, if the two tracked instantaneous carrier phases (measured by the receivers coupled to the dual antennas) of the satellite signal are compared, the difference between the tracked instantaneous carrier phases will be due to the path length difference for the signal to reach the dual antennas. In some cases, however, the path length difference between the two instantaneous tracked carrier phases is greater or equal to 19 cm (roughly the wavelength for a GNSS L1 signal). In these cases, it is necessary to use carrier phases from multiple satellites to determine what the true path length differences are, based on the carrier phase measurements. Such techniques are known and referred to as ambiguity resolution.

Figure 2B:
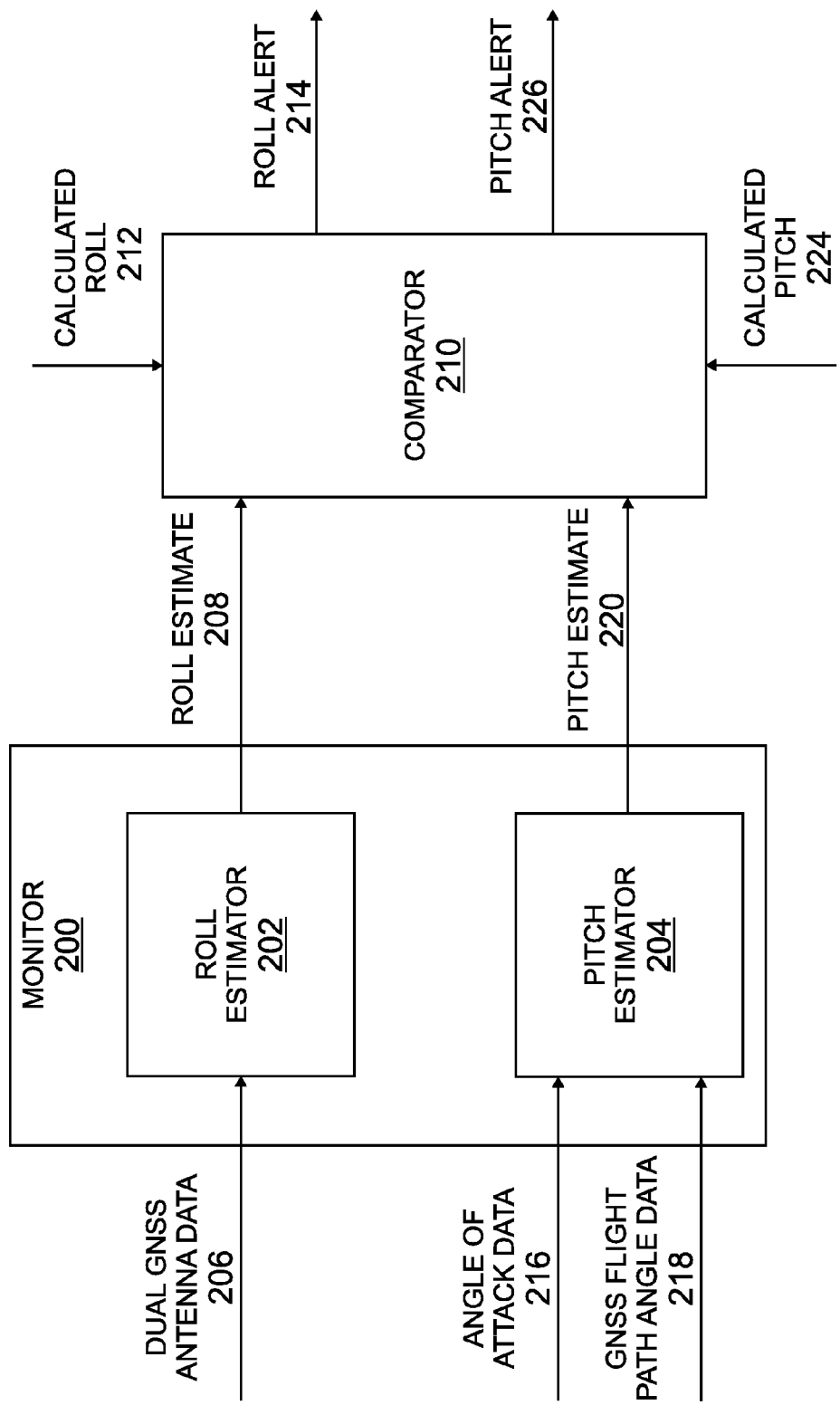

This roll estimate 208 determined by the roll estimator 202 can be communicated to a comparator 210 included in the monitor 200, which can compare the roll estimate 208 to a calculated roll solution 212 by one of the at least one IMUs 110, 120, 130. In some embodiments, the comparator can be implemented externally to the monitor 200, as shown in FIG. 2B. If the difference between the roll estimate 208 and the calculated roll solution 212 from an IMU 110, 120, 130 is less than a threshold, then the monitor 200 can repeat the process when new data 206 is received and/or when another calculated roll solution 212 is received by the monitor 200. However, if the difference between the roll estimate 208 and the calculated roll 212 is greater than a threshold, then the monitor 200 can send a roll alert 214 to the instrument status display 150 of the aircraft so that the flight crew can be alerted to the faulty IMU. In exemplary embodiments, the threshold for communicating a roll alert 214 to the instrument status display 150 can be when the roll estimate 208 and the calculated roll 212 differ by more than 10 degrees. However, this is only an example and not meant to be limiting.

Once the roll alert 214 and the respective IMU 110, 120, 130 that is producing the erroneous calculated roll 212 is received by the flight crew at the instrument status display 150, the flight crew may decide to ignore the faulty IMU 110, 120, 130, rely solely on the one remaining IMU 110, 120, 130 and/or ensure the faulty IMU 110, 120, 130 is inspected after the aircraft lands at its destination.

As stated above, in some embodiments, the monitor 200 can be dedicated to a single IMU 110, 120, 130. In these embodiments, the monitor 200 will compare the calculated roll 212 from the single IMU 110, 120, 130 with the roll estimate 208. In embodiments where the monitor 200 is not dedicated to a single IMU 110, 120, 130, the monitor will compare a respective calculated roll 212 from each of the IMUs 110, 120, 130 with the roll estimate 208. In these embodiments, along with a roll alert 214, the monitor 200 will communicate the specific IMU 110, 120, 130 that is yielding an erroneous calculated roll 212 to the instrument status display 150.

In exemplary embodiments, in addition to producing a roll estimate 208, the monitor 200 can also produce a pitch estimate 216 using a pitch estimator 204. In some embodiments, the pitch estimator 204 can receive angle of attack data 216 and GNSS flight path angle 218. As is known, the angle of attack is the angle between the airspeed vector and the centerline of the fuselage (or other line fixed on the fuselage), where the centerline vector defines the pitch angle relative to a local geographic coordinate frame. The flight path angle is the direction of the GNSS velocity vector, relative to a local geographic coordinate frame. Therefore, by adding the angle of attack data 216 to the GNSS flight path angle 218, the pitch estimator 204 can produce a pitch estimate 220 of the aircraft. In some embodiments, there may be a fixed offset included in the pitch estimator 204 depending on the direction of the body of the aircraft when the angle of attack is zero. Stated another way, the zero point for the angle of attack data 216 can be an adjustable parameter depending on how a specific aircraft flies.

Similar to above, the pitch estimate 220 calculated by the pitch estimator 204 can be communicated to a comparator 210, which can compare the pitch estimate 220 to a calculated pitch solution 224 by one of the at least one IMUs 110, 120, 130. If the difference between the pitch estimate 220 and the calculated pitch solution 224 from an IMU 110, 120, 130 is less than a threshold, then the monitor 200 can repeat the process when new data 216, 218 is received and/or when another calculated pitch solution 224 is received by the monitor 200. However, if the difference between the pitch estimate 220 and the calculated pitch 224 is greater than a threshold, then the monitor 200 can send a pitch alert 226 to the instrument status display 150 of the aircraft so that the flight crew can be alerted to the faulty IMU. In exemplary embodiments, the threshold for communicating a pitch alert 226 to the instrument status display 150 can be when the pitch estimate 220 and the calculated pitch 224 differ by more than 5 degrees. However, this is only an example and not meant to be limiting.

Once the pitch alert 226 and the respective IMU 110, 120, 130 that is producing the erroneous calculated pitch 224 is received by the flight crew at the instrument status display 150, the flight crew may decide to ignore the faulty IMU 110, 120, 130, rely solely on the one remaining IMU 110, 120, 130 and/or ensure the faulty IMU 110, 120, 130 is inspected after the aircraft lands at its destination.

Figure 3:
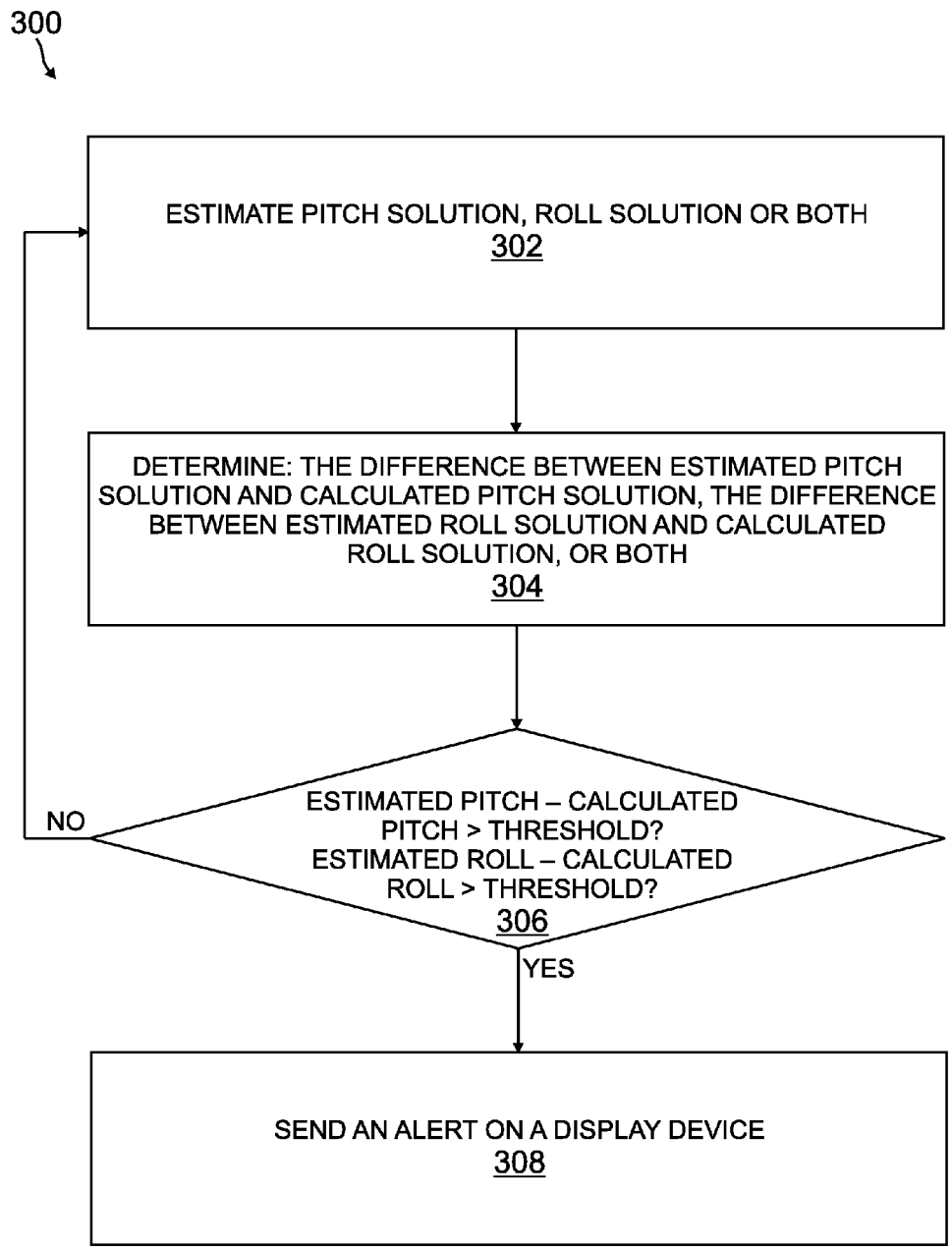
FIG. 3 is a flow diagram of an example method for detecting attitude faults in one or more inertial measurement units.

FIG. 3 is a flow diagram of an example method 300 for detecting attitude faults in one or more IMUs. The method 300 comprises determining at least one estimated pitch solution or at least one estimated roll solution or both (block 302). In some embodiments, to estimate the pitch of the aircraft, the methods described above in FIGS. 2A-2B can be used. For example, the pitch can be estimated by adding the angle of attack of the aircraft to the flight path angle of the aircraft. Similar to above, the angle of attack can include an offset for a specific aircraft, depending on how the aircraft actually flies, as discussed above in FIGS. 2A-2B. In some embodiments, a fixed offset can be included in the estimated pitch solution, depending on what the body of the aircraft is when the angle of attack is zero, as described in more detail in FIGS. 2A-2B above. Moreover, similar to above, in some embodiments, to estimate the roll of the aircraft, the methods described above in FIGS. 2A-2B can be used. For example, the roll can be estimated by determining a double-differencing solution using data from transversely mounted dual GNSS antennas.

The method 300 further comprises determining: a difference between the at least one estimated pitch solution and a calculated pitch solution, a difference between the at least one estimated roll solution and a calculated roll solution, or both (block 304). The calculated attitude solution can be provided by one or more IMUs, similar to the IMUs 110, 120, 130 discussed above in FIGS. 1A-1B.

The method continues at block 306, wherein if the difference between the estimated pitch solution and the calculated pitch solution is greater than a threshold, or if the difference between the estimated roll solution and the calculated roll solution is greater than a threshold, or both, then the method 300 proceeds to block 308. However, if the difference between the estimated pitch solution and the calculated pitch solution is less than a threshold, or if the difference between the estimated roll solution and the calculated roll solution is less than a threshold, or both, then the method 300 returns to block 302. This represents the situation where one or more IMUs are producing accurate enough results to not warrant sending an alert to the flight crew. In exemplary embodiments, a threshold for proceeding to block 308 can be when a pitch estimate differs by a calculated pitch by more than 5 degrees or when a roll estimate differs by a calculated roll by more than 10 degrees. However, these are only examples and not meant to be limiting.

If the method 300 does proceed to block 308 because the difference between the estimated pitch solution and the calculated pitch solution exceeds a threshold, or the difference between the estimated roll solution and the calculated roll solution exceeds a threshold, or both, then an alert is sent to a display device (block 308). The alert includes information about the specific IMU that is producing the erroneous roll or pitch solution. In some embodiments, the display device can be similar to the instrument status display 150 discussed in FIGS. 1A-1B above.

One or more actions described in the present methods can be implemented by computer executable instructions, such as program modules or components, which are executed by at least one processor. Generally, program modules include routines, programs, objects, data components, data structures, algorithms, and the like, which perform particular tasks or implemented particular abstract data types.

Instructions for carrying out the various process tasks, calculations, and generation of other data used in operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programming logic device.

Exemplary Embodiments

Example 1 includes an avionics system comprising: at least one inertial measurement unit configured to produce a calculated pitch solution, a calculated roll solution, or both; at least one monitor coupled to the at least one inertial measurement unit and configured to produce an estimated pitch solution, an estimated roll solution, or both, wherein the at least one monitor produces the estimated pitch solution by adding angle of attack data to flight path angle data, and wherein the at least one monitor produces the estimated roll solution by calculating a double-differencing solution using data from transversely mounted dual global navigation satellite system antennas; a comparator, wherein the comparator determines the difference between the calculated pitch solution and the estimated pitch solution, the difference between the calculated roll solution and the estimated roll solution, or both; and at least one display device communicatively coupled to the comparator; wherein the at least one display device receives a warning message from the comparator when the difference between the calculated pitch solution and the estimated pitch solution is greater than a pitch threshold, or when the difference between the calculated roll solution and the estimated roll solution is greater than a roll threshold, or both.

Example 2 includes the avionics system of Example 1, wherein the pitch threshold is 5 degrees.

Example 3 includes the avionics system of any of Examples 1-2, wherein the roll threshold is 10 degrees.

Example 4 includes the avionics system of any of Examples 1-3, wherein for each of the at least one inertial measurement units there is a respective monitor of the at least one monitors that is incorporated into each of the least one inertial measurement units.

Example 5 includes the avionics system of any of Examples 1-4, wherein for each of the at least one inertial measurement units there is a respective monitor of the at least one monitors that is external to a respective inertial measurement unit and coupled to the respective inertial measurement unit.

Example 6 includes the avionics system of any of Examples 1-5, wherein the at least one monitor comprises a single monitor and the single monitor is coupled to all of the at least one inertial measurement units.

Example 7 includes the avionics system of any of Examples 1-6, wherein the comparator is included in the at least one monitor.

Example 8 includes the avionics system of any of Examples 1-7, wherein the comparator is located external to the at least one monitor.

Example 9 includes the avionics system of any of Examples 1-8, wherein the estimated pitch solution includes a fixed offset that is determined by the direction of the body of the aircraft when the angle of attack is zero.

Example 10 includes a non-transitory computer-readable medium having computer-executable instructions stored thereon which, when executed by one or more processors, cause the one or more processors to perform the steps of: producing a pitch estimate solution by adding angle of attack data to flight path angle data of an aircraft; and producing a roll estimate solution by calculating a double-differencing solution using data from transversely mounted dual global navigation satellite system antennas.

Example 11 includes the non-transitory computer-readable medium of Example 10, further comprising instructions which, when executed by one or more processors, cause the one or more processors to perform the steps of: determining the difference between a calculated pitch solution and the estimated pitch solution, the difference between a calculated roll solution and the estimated roll solution, or both.

Example 12 includes the non-transitory computer-readable medium of Example 11, further comprising instructions which, when executed by one or more processors, cause the one or more processors to perform the steps of: causing a warning message to be sent to a display device when the difference between the calculated pitch solution and the estimated pitch solution is greater than a pitch threshold, or when the difference between the calculated roll solution and the estimated roll solution is greater than a roll threshold, or both.

Example 13 includes the non-transitory computer-readable medium of Example 12, wherein the pitch threshold is 5 degrees.

Example 14 includes the non-transitory computer-readable medium of any of Examples 12-13, wherein the roll threshold is 10 degrees.

Example 15 includes the non-transitory computer-readable medium of any of Examples 10-14, wherein the estimated pitch solution includes a fixed offset that is determined by the direction of the body of the aircraft when the angle of attack is zero.

Example 16 includes a method for attitude fault detection in one or more inertial measurement units, comprising: determining an estimated pitch solution, an estimated roll solution, or both, wherein the estimated pitch solution is determined by adding angle of attack data to flight path angle data and wherein the estimated roll solution is determined by calculating a double-differencing solution using data from transversely mounted dual global navigation satellite system antennas; and determining a difference between the estimated pitch solution and a calculated pitch solution, the estimated roll solution and a calculated roll solution, or both; and sending a warning message to a display device when the difference between the estimated pitch solution and the calculated pitch solution is greater than a pitch threshold, the difference between the estimated roll solution and the calculated roll solution is greater than a roll threshold, or both.

Example 17 includes the method of Example 16, wherein the pitch threshold is 5 degrees.

Example 18 includes the method of any of Examples 16-17, wherein the roll threshold is 10 degrees.

Example 19 includes the method of any of Examples 16-18, wherein an inertial measurement unit determines the calculated pitch solution and the calculated roll solution; wherein a monitor determines the estimated pitch solution and the estimated roll solution; and wherein the monitor is incorporated into the inertial measurement unit.

Example 20 includes the method of any of Examples 16-19, wherein an inertial measurement unit determines the calculated pitch solution and the calculated roll solution; wherein a monitor determines the estimated pitch solution and the estimated roll solution; and wherein the monitor is external to the inertial measurement unit and coupled to the inertial measurement unit.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An avionics system comprising:
    at least one inertial measurement unit that produces a calculated pitch solution and a calculated roll solution;
    at least one monitor responsive to attitude changes based on a combination of angle of attack data and global navigation satellite system signals and producing in accordance with dissimilar techniques an estimated pitch solution and an estimated roll solution,
    wherein the at least one monitor in accordance with a first technique produces the estimated pitch solution by adding angle of attack data to flight path angle data, and
    wherein the at least one monitor in accordance with a dissimilar second technique produces the estimated roll solution by calculating a double-differencing solution using data from transversely mounted dual global navigation satellite system antennas;
    a comparator responsive to the inertial measurement unit, wherein the comparator generates a warning message to indicate a fault condition in the at least one inertial measurement unit based on the calculated pitch solution and the calculated roll solution wherein the comparator determines the difference between the calculated pitch solution and the estimated pitch solution, and the difference between the calculated roll solution and the estimated roll solution; and
    at least one display device communicatively coupled to the comparator;
    wherein the at least one display device is sent the warning message from the comparator when the difference between the calculated pitch solution and the estimated pitch solution is greater than a pitch threshold, or when the difference between the calculated roll solution and the estimated roll solution is greater than a roll threshold, or both, and wherein the display device displays the warning message to alert a crew member to control attitude based on attitude measurements produced from a different attitude sensor.

2. The avionics system of claim 1, wherein the pitch threshold is 5 degrees.

3. The avionics system of claim 1, wherein the roll threshold is 10 degrees.

4. The avionics system of claim 1, wherein for each of the at least one inertial measurement units there is a respective monitor of the at least one monitors that is incorporated into each of the least one inertial measurement units.

5. The avionics system of claim 1, wherein for each of the at least one inertial measurement units there is a respective monitor of the at least one monitors that is external to a respective inertial measurement unit and coupled to the respective inertial measurement unit.

6. The avionics system of claim 1, wherein the at least one monitor comprises a single monitor and the single monitor is coupled to all of the at least one inertial measurement units.

7. The avionics system of claim 1, wherein the comparator is included in the at least one monitor.

8. The avionics system of claim 1, wherein the comparator is located external to the at least one monitor.

9. The avionics system of claim 1, wherein the estimated pitch solution includes a fixed offset that is determined by the direction of the body of the aircraft when the angle of attack is zero.

10. A non-transitory computer-readable medium having computer-executable instructions stored thereon which, when executed by one or more processors, cause the one or more processors to perform the steps of:
   producing a calculated pitch solution and a calculate roll solution from at least one inertial measurement unit;
   producing in accordance with dissimilar techniques an estimated pitch solution and an estimated roll solution, wherein the estimated pitch solution is produced in accordance with a first technique by adding angle of attack data to flight path angle data, and wherein the estimated roll solution is produced in accordance with a dissimilar second technique by calculating a double-differencing solution using data from transversely mounted dual global navigation satellite system antennas;
   in response to receiving an output from the inertial measurement unit, generating a warning message to indicate a fault condition in the at least one inertial measurement unit based on the calculated pitch solution and the calculated roll solution and further based on determining a difference between the calculated pitch solution and the estimated pitch solution and a difference between the calculated roll solution and the estimated roll solution;
   causing the warning message to be sent to a display device and displayed on the display device to alert a crew member to control attitude based on attitude measurements produced from a different attitude sensor, wherein the warning message is sent when the difference between the calculated pitch solution and the estimated pitch solution is greater than a pitch threshold, or when the difference between the calculated roll solution and the estimated roll solution is greater than a roll threshold, or both.

11. The non-transitory computer-readable medium of claim 10, wherein the pitch threshold is 5 degrees.

12. The non-transitory computer-readable medium of claim 10, wherein the roll threshold is 10 degrees.

13. The non-transitory computer-readable medium of claim 10, wherein the estimated pitch solution includes a fixed offset that is determined by the direction of the body of the aircraft when the angle of attack is zero.

14. A method for attitude fault detection in one or more inertial measurement units, comprising:
   producing a calculated pitch solution and a calculate roll solution from at least one inertial measurement unit;
   producing in accordance with dissimilar techniques an estimated pitch solution and an estimated roll solution, wherein the estimated pitch solution is produced in accordance with a first technique by adding angle of attack data to flight path angle data, and wherein the estimated roll solution is produced in accordance with a dissimilar second technique by calculating a double-differencing solution using data from transversely mounted dual global navigation satellite system antennas;
   in response to receiving an output from the inertial measurement unit, generating a warning message to indicate a fault condition in the at least one inertial measurement unit based on the calculated pitch solution and the calculated roll solution and further based on determining a difference between the estimated pitch solution and the calculated pitch solution, and a difference between the estimated roll solution and the calculated roll solution; and
   sending the warning message to a display device when the difference between the estimated pitch solution and the calculated pitch solution is greater than a pitch threshold, the difference between the estimated roll solution and the calculated roll solution is greater than a roll threshold, or both, and wherein the display device displays the warning message to alert a crew member to control attitude based on attitude measurements produced from a different attitude sensor.

15. The method of claim 14, wherein the pitch threshold is 5 degrees.

16. The method of claim 14, wherein the roll threshold is 10 degrees.

17. The method of claim 14, wherein an inertial measurement unit determines the calculated pitch solution and the calculated roll solution; wherein a monitor determines the estimated pitch solution and the estimated roll solution; and wherein the monitor is incorporated into the inertial measurement unit.

18. The method of claim 14; wherein an inertial measurement unit determines the calculated pitch solution and the calculated roll solution; wherein a monitor determines the estimated pitch solution and the estimated roll solution; and wherein the monitor is external to the inertial measurement unit and coupled to the inertial measurement unit.

* * * * *